United States Patent [19]
Carroll

[11] Patent Number: 5,509,709
[45] Date of Patent: Apr. 23, 1996

[54] PICK-UP TRUCK BED ATTACHMENT

[76] Inventor: Richard I. Carroll, 17913 N. 71st Dr., Glendale, Ariz. 85308

[21] Appl. No.: 86,129

[22] Filed: Jul. 6, 1993

[51] Int. Cl.$^6$ ..................................................... B60P 7/00
[52] U.S. Cl. ............................... 296/3; 296/376; 296/100
[58] Field of Search .......................... 296/100, 3, 37.6, 296/36, 42, 26, 13, 14; 16/381, 263, 262; 280/147, 145; 410/101, 102

[56] References Cited

U.S. PATENT DOCUMENTS

| 639,102 | 12/1899 | Sears | 296/14 |
|---|---|---|---|
| 818,285 | 4/1906 | Poole . | |
| 1,052,701 | 2/1913 | Watters | 16/381 X |
| 1,189,201 | 6/1916 | Hurd | 16/381 |
| 1,621,047 | 3/1927 | Young . | |
| 2,566,872 | 9/1951 | Bernhardt | 16/381 |
| 2,997,330 | 8/1961 | Boultinghouse | 296/3 |
| 3,574,391 | 4/1971 | Doboze | 296/36 |
| 3,765,717 | 10/1973 | Garuart | 296/137 |
| 4,181,351 | 1/1980 | Spanke | 296/100 |
| 4,216,988 | 8/1980 | Weiss | 296/43 |
| 4,216,990 | 8/1980 | Musgrove et al. | 296/213 |
| 4,378,127 | 3/1983 | Rossi, Sr. | 296/3 |
| 4,381,580 | 5/1983 | Hellstrom et al. | 16/243 |
| 4,435,010 | 3/1984 | Mandel | 296/100 |
| 4,475,266 | 10/1984 | Suska | 16/381 X |
| 4,585,264 | 4/1986 | Miller | 296/3 |
| 4,647,103 | 3/1987 | Walbay | 296/100 |
| 4,695,087 | 9/1987 | Hollrock | 296/100 X |
| 4,703,969 | 11/1987 | Rayburn et al. | 296/3 |
| 4,830,242 | 5/1989 | Painter | 296/26 X |
| 4,993,088 | 2/1991 | Chudik | 296/26 X |

FOREIGN PATENT DOCUMENTS

| 2221852 | 11/1973 | Germany | 16/381 |
|---|---|---|---|
| 148661 | 11/1980 | Japan | 296/36 |
| 149167 | 3/1955 | Sweden | 296/14 |
| 38720/75 | 11/1979 | United Kingdom . | |

Primary Examiner—David M. Mitchell
Assistant Examiner—Gary C. Hoge
Attorney, Agent, or Firm—Parsons & Associates; Don J. Flickinger; Robert A. Parsons

[57] ABSTRACT

An attachment for a pick-up truck bed including a plurality of vertical supports having a lower end attached to the pick-up truck bed, a flat bed affixed to upper ends of the vertical supports, racks pivotally attached adjacent edges of the flat bed for movement between an upright and a lowered position, horizontal tracks affixed to the vertical supports, and a bed engaged in the tracks for movement between a stored and an extended position.

11 Claims, 4 Drawing Sheets

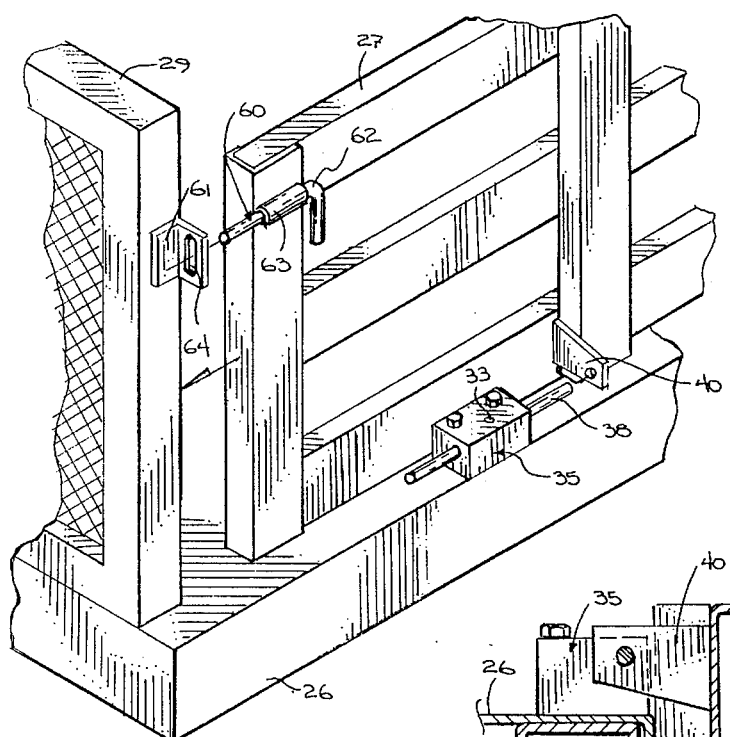
FIG. 5
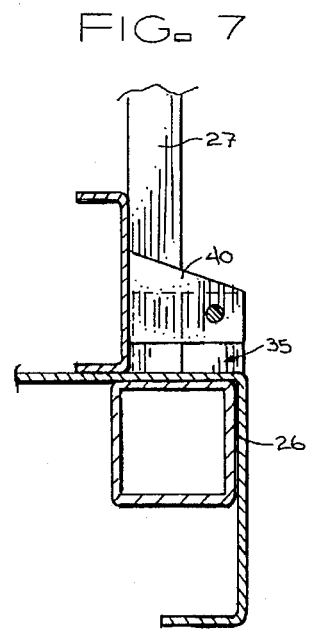
FIG. 7
FIG. 8
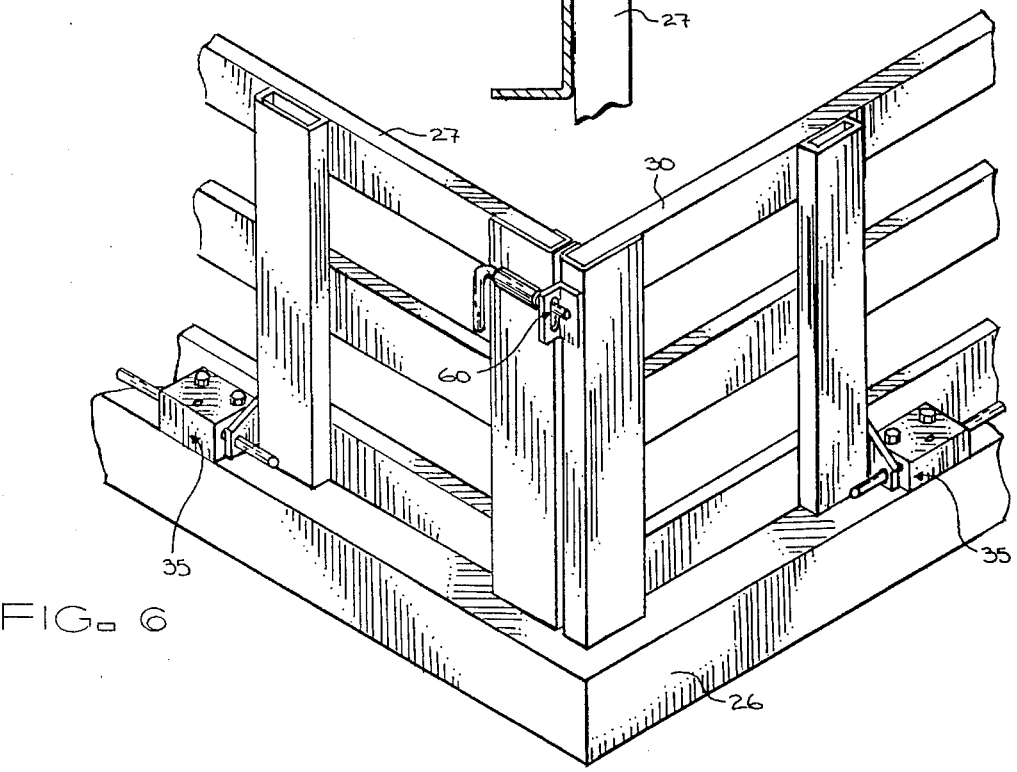
FIG. 6

PICK-UP TRUCK BED ATTACHMENT

BACKGROUND OF THE INVENTION

1. Field of the Invention

The present invention pertains to pick-up truck beds.

More particularly, the present invention relates to attachments to a pick-up truck bed.

In a further and more specific aspect, the instant invention concerns pick-up truck bed attachments which extend the use of the pick-up truck bed.

2. Prior Art

The use of pick-up truck beds for storage or carrying loads is generally well known. The construction of conventional pick-up truck beds does not allow for the storage of small items. Another well known problem with pick-up truck beds is the lack of storage capacity for large or cumbersome loads.

Pick-up truck bed attachments to extend the use thereof are known. There are various types of prior art pick-up truck bed attachments. One prior art device is designed to carry large or cumbersome loads. Another device is designed to extend the storage capacity of the pick-up truck bed with ready access to all storage areas.

The pick-up truck bed attachments used for large or cumbersome loads take the form of flat beds attached to the pick-up truck bed. These are used to transport loads which would not fit into the pick-up truck bed itself. These attachments do not facilitate the easy storage of smaller loads.

The pick-up truck bed attachments which increase the storage capacity of the pick-up truck bed take the form of small compartmentalized bins which allow storage of small loads. These attachments do not facilitate the transport of large or cumbersome loads.

Pick-up truck owners have a choice of either of the above mentioned attachments, but in so doing sacrifice the versatility of the pick-up truck bed. The owners are forced to remove or replace a pick-up bed attachment when the situation calls for something other than what their attachment can handle and there is no easy solution to the problem of carrying large or cumbersome loads while providing increased storage capacity with ready access.

It can be seen from the above-mentioned examples of prior art that there are many ways to extend the use of pick-up truck beds. Despite all the prior art there still exists a need for a sturdy and versatile pick-up truck attachment which can carry heavy loads, while providing increased storage capacity with ready access.

It would be highly advantageous, therefore, to remedy the foregoing and other deficiencies inherent in the prior art.

Accordingly, it is an object of the present invention to provide an improved pick-up truck bed attachment.

Another object of the present invention is provision of a pick-up truck bed attachment which is highly versatile.

And another object of the invention is to provide a pick-up truck bed attachment which is easy to use.

Still another object of this invention is the provision of a pick-up truck bed attachment which can carry large, heavy or cumbersome loads.

Yet another object of the invention to provide a pick-up truck bed attachment which is sturdy and stable.

Yet still another object of the immediate invention to provide a pick-up truck bed attachment which is inexpensive to manufacture.

And a further object of the invention is to provide a pick-up truck bed attachment with increased storage capacity while providing ready access to all storage areas.

SUMMARY OF THE INVENTION

Briefly, to achieve the desired objects of the invention in accordance with the preferred embodiments thereof, provided is an attachment for a pick-up truck bed having an open topped rectangular box with upright sides, the attachment including a plurality of vertical supports having a lower end constructed to be attached to a pick-up truck bed, a flat bed affixed to upper ends of the vertical supports, and racks pivotally attached adjacent edges of the flat bed for movement between a first upright position and a second lowered position.

BRIEF DESCRIPTION OF THE DRAWINGS

The forgoing and further and more specific objects and advantages of the instant invention will become readily apparent to those skilled in the art from the following detailed description of the preferred embodiments thereof taken in conjunction with the drawings, in which:

FIG. 5 is an enlarged perspective view of a portion of attachment, illustrating partial assembly thereof;

FIG. 6 is a view similar to FIG. 5 illustrating an assembled position thereof;

FIG. 7 is an enlarged sectional view of a portion of the attachment, illustrating a rack in a first upright position;

FIG. 8 is a view similar to FIG. 7 with the rack in a second lowered position;

BRIEF DESCRIPTION OF THE PREFERRED EMBODIMENT

Figure 1:
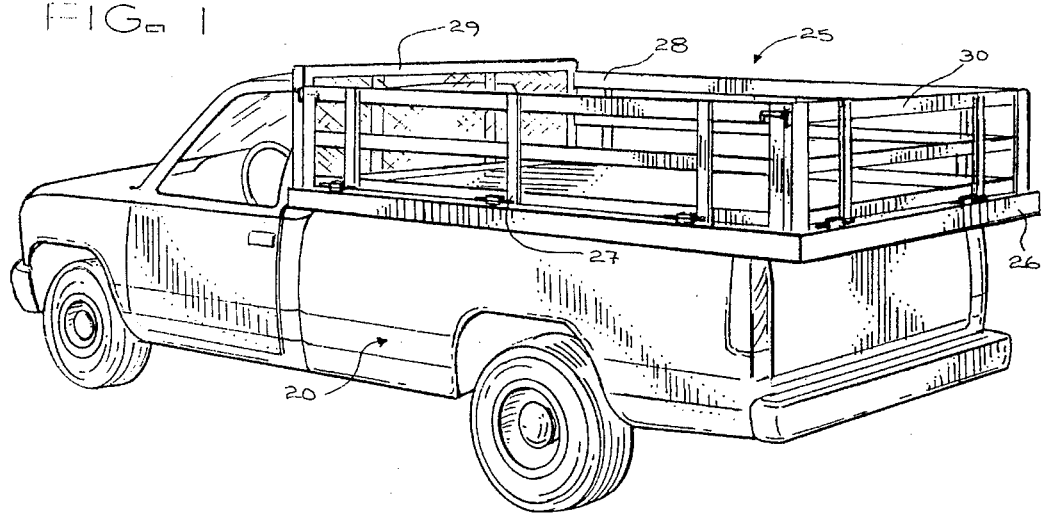
FIG. 1 is a perspective view of a pick-up truck including an attachment constructed in accordance with the teachings of the instant invention.
Figure 2:
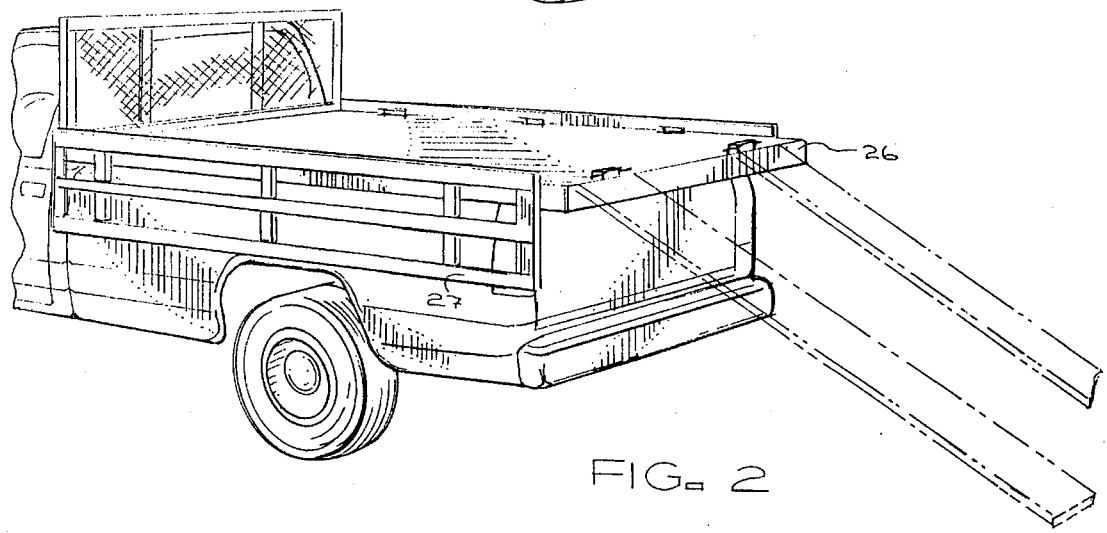
FIG. 2 is a perspective view similar to FIG. 1 with the attachment in a different position.
Figure 3:
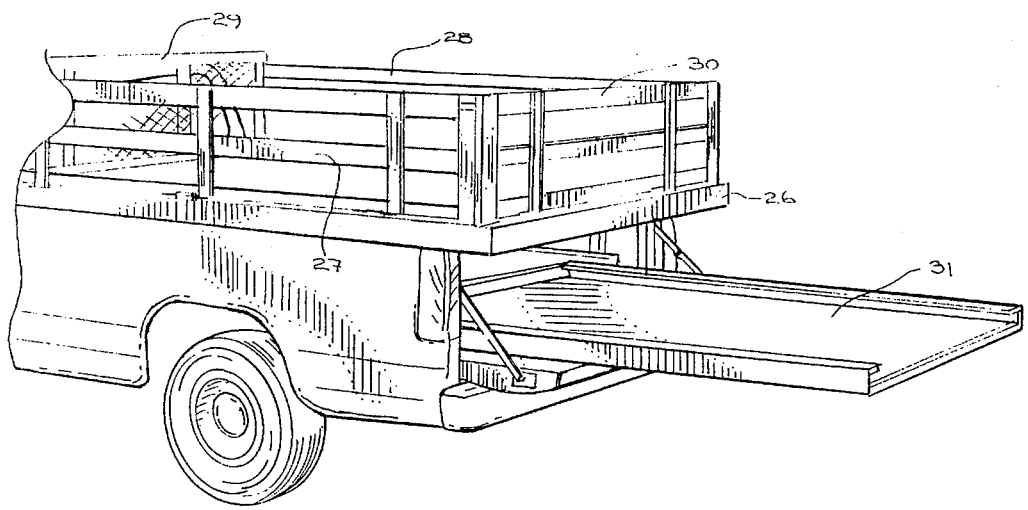
FIG. 3 is a perspective view similar to FIG. 1 with a portion of the attachment in an extended position.

Turning now to the drawings, in which like reference characters indicate corresponding elements throughout the several views, attention is first directed to FIG. 1 which shows a perspective view of a pick-up truck 20 having an attachment 25 embodying the instant invention. Attachment 25 includes a flat bed 26, first and second side racks 27 and 28, a front rack 29 and a rear rack 30. First and second side racks 27 and 28 and rear rack 30 are illustrated in a first upright position. Referring to FIG. 2 first and second side racks 27 and 28 are illustrated in a second lowered position and rear rack 30 is disengaged from flat bed 26. Referring to FIG. 3 first and second side racks 27 and 28 and rear rack 30 are illustrated in the first upright position and a movable bed 31 is illustrated in an extended position.

Figure 4:
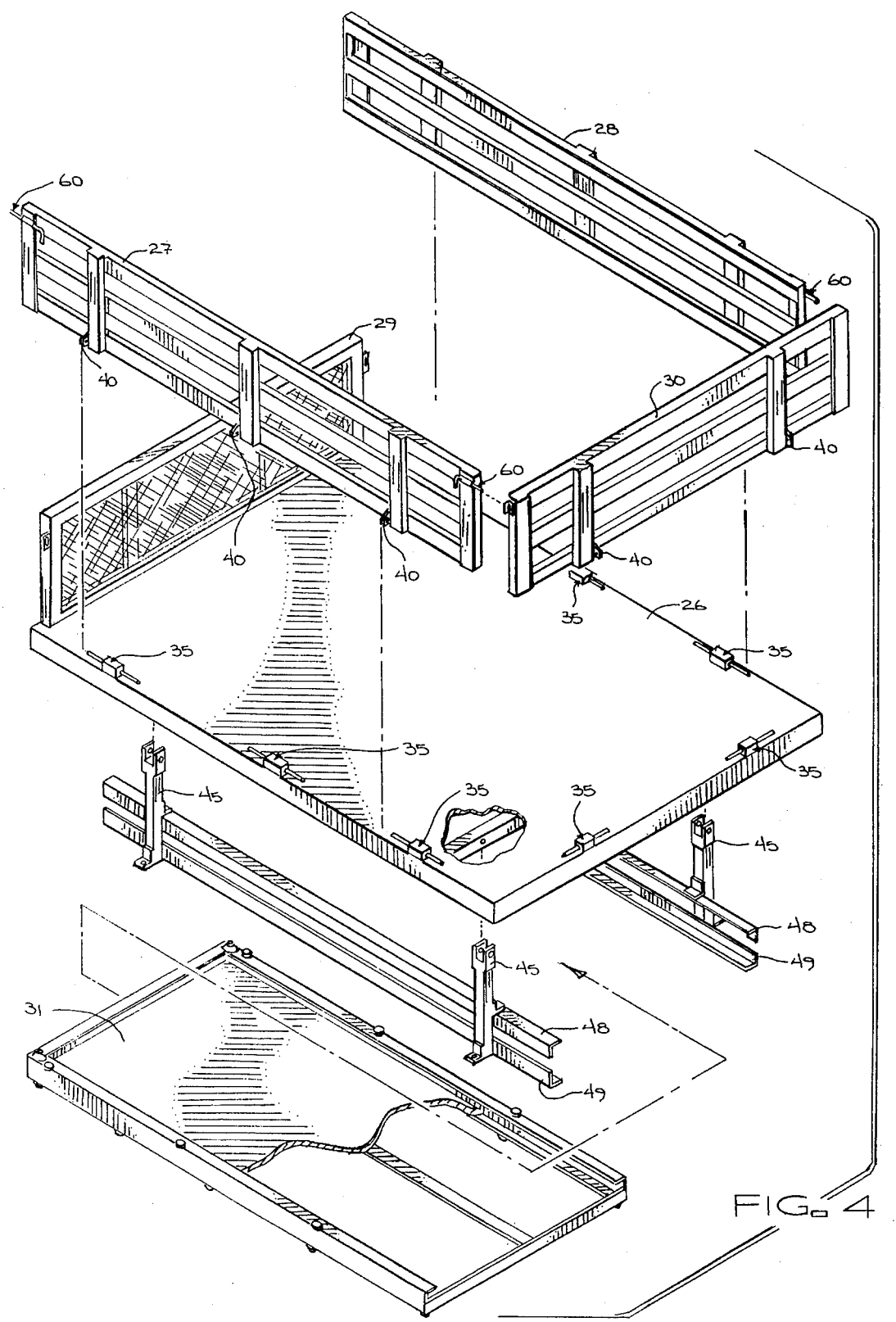
FIG. 4 is an exploded perspective view of the attachment of FIG. 1.
Figure 11:
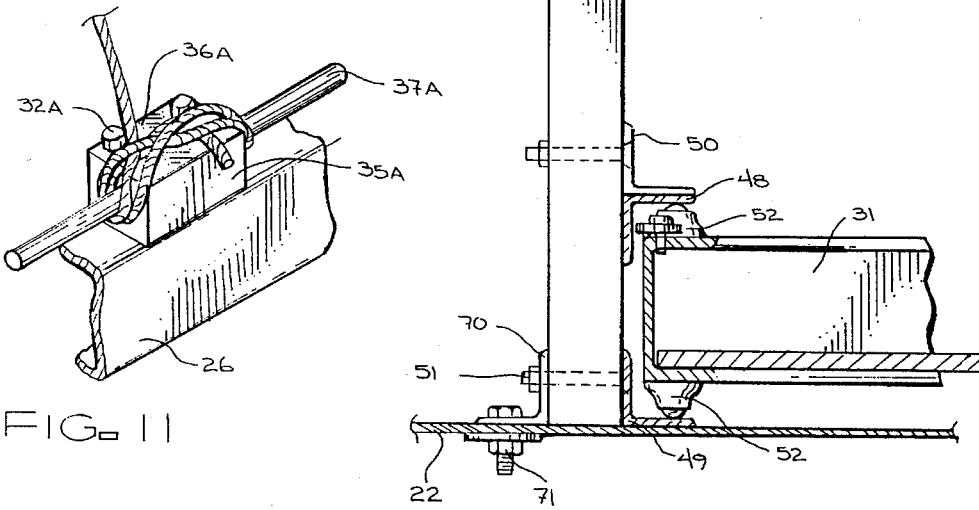
FIG. 11 is an enlarged view of a first pivot rod assembly.
Figure 12:
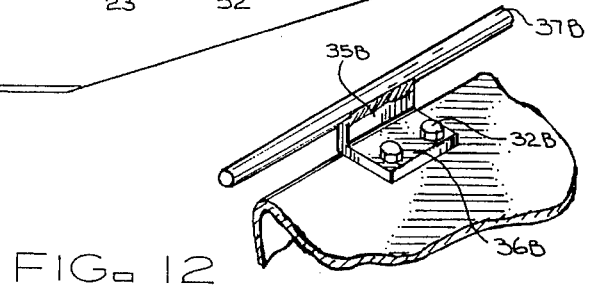
FIG. 12 is an enlarged view of a second pivot rod assembly.

FIG. 4 is an exploded perspective view of the attachment 25. Attachment 25 includes the flat bed 26 to which a plurality of pivot rod assemblies 35 are affixed adjacent to the edges thereof by some convenient means such as welding, bolts, etc. Two possible embodiments of a pivot rod assembly, designated 35A and 35B, are illustrated in FIGS. 11 and 12, respectively. Pivot rod assembly 35A in FIG. 11 includes a base member 36A which is a generally block-shaped piece of metal with a horizontal hole extended therethrough. An elongated rod 37A is positioned in the hole so as to extend outwardly on opposite sides of base member 36A. Elongated rod 37A is affixed in place by means of a set screw 33 (see FIG. 5), welding, etc. Base member 36A has a plurality of vertical holes formed therethrough with bolts 32A extending therethrough to affix base member 36A to flat bed 26. Also shown in FIG. 11 is the use of the pivot rod assembly 35A for a second purpose, namely as a tie down or cleat for a rope.

FIG. 12 illustrates a pivot rod assembly 35B having a base member 36B which is generally an angular piece of metal with an L-shaped cross-section. Elongated rod 37B is affixed adjacent the end of one arm of base member 36B. The other arm is positioned parallel to the flat bed 26 and affixed thereto by means of bolt 32B, welding, or the like.

Attachment 25 also includes first and second side racks 27 and 28 and rear rack 30 to which a plurality of plates 40 (see FIG. 7 and 8) are affixed, by bolts, welding, or the like, to extend outwardly therefrom. Each of the plurality of plates 40 has a hole therein for pivotally engaging one of the pivot rod assemblies 35 to allow movement of first and second side racks 27 and 28 and rear rack 30 between the first upright position and the second lowered position.

First and second side racks 27 and 28 and rear rack 30 include a plurality of latches 60 for securing the first and second side racks 27 and 28 and rear rack 30 to each other and in the first upright position. Details of the operation of latches 60 and pivot rod assemblies 35 are illustrated in FIG. 5 and 6. Referring specifically to FIG. 5, front rack 29 and side rack 27 are illustrated in the first upright but disengaged position. Latch 60 includes a hasp 61, a locking pin 62 and a pin mount 63. Hasp 61 is a generally angularly shaped piece of metal with opening 64 through one arm and the other arm affixed to an end surface of rack 29. Pin mount 63 is affixed to an outer surface of adjacent rack 27 with locking pin 62 pivotally mounted therein for engagement into opening 64 of hasp 61.

Referring specifically to FIG. 5 it can be seen that rack 27 is in the disengaged position wherein plate 40 is disengaged from elongated rod 38 and locking pin 62 is disengaged from opening 64 of hasp 61. Rack 27 is illustrated in the first upright position and by sliding rack 27 to the left plate 40 pivotally engages elongated rod 38 and locking pin 62 engages opening 64 locking rack 27 in the first upright position. Referring to FIG. 6 it can be seen that similar mounting apparatus at the other end of rack 27 engages the other end to flat bed 26 and rear rack 30. Also, it should be noted that locking pin 62 can be moved horizontally within pin mount 63 to facilitate the engaging and locking procedure and to allow unlocking of individual racks.

It should be noted that plates 40 are elongated sufficiently to place the pivot axis parallel with but outside the main body of rack 27. Referring to FIG. 7 and 8, rack 27 is illustrated in the first upright position and in a second lowered position, respectively. By positioning the pivot axis as illustrated, rack 27 moves freely from the first upright position, wherein rack 27 extends vertical upward from flat bed 26, to the second lowered position, wherein rack 27 extends vertically downward adjacent the outer edge of flat bed 26.

Figure 9:
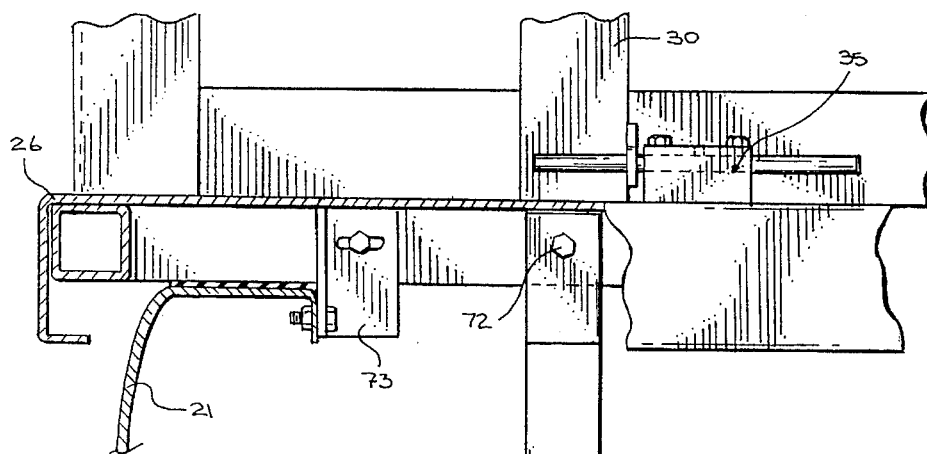
FIG. 9 is an enlarged cross-sectional view illustrating portions of the attachment in more detail.

Flat bed 26 is affixed to upper ends of a plurality of vertical supports 45 (in this embodiment 4). A detailed view of a single vertical support 45 is illustrated in FIG. 9. Vertical supports 45 have a length sufficient to position the flat bed 26 above upright sides 21 of the bed of pick-up truck 20. A lower end of each vertical support 45 has one arm of an angular mounting bracket 70 affixed thereto by means of bolts, welding, etc. The other arm of angular mounting bracket 70 is affixed to the inner flat surface 22 of the bed of pick-up truck 20 by means of bolts 71, welding, or the like. The upper end of vertical support 45 is bifurcated and affixed to a frame member in the underside of flat bed 26 by means of bolts 72, welding, or the like. One arm of a section of angle iron 73 is affixed to the frame member and the other arm is affixed to an inner surface of upright sides 21 to provide additional lateral support.

FIG. 4 illustrates a pair of upper tracks 48 and a pair of lower tracks 49 affixed to vertical supports 45 for slidably engaging a movable bed 31. A detailed view of an upper track 48 and a lower track 49 is illustrated in FIG. 9. Upper track 48 includes an elongated section of angle iron having one arm of angular mounting brackets 50 affixed thereto by welding or the like. The opposite arms of angular mounting brackets 50 are affixed to vertical supports 45 by bolting, welding, or the like. Lower track 49 also includes an elongated section of angle iron, one arm of which is affixed to vertical upright 45 by means of bolts, welding, etc. In the embodiment illustrated in FIG. 9 a single bolt is utilized to affix lower track 49 to vertical support 45 and to affix vertical support 45 to angular mounting bracket 70. The angle irons of upper track 48 and lower track 49 are positioned to provide parallel spaced apart flat running surfaces.

Figure 10:
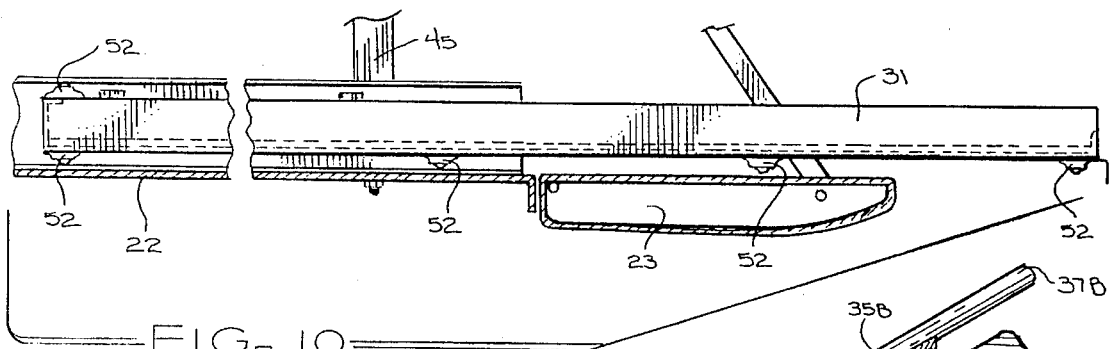
FIG. 10 is a sectional view illustrating a portion of the attachment in an extended position.

FIG. 9 illustrates movable bed 31 is in a stored position. A plurality of rollers 52 are affixed adjacent the upper and lower edges of movable bed 31 by welding or the like for slidably engaging the flat running surfaces of upper track 48 and lower track 49. Rollers 52 provide for the movement of movable bed 31 from the stored position to an extended position. A detailed view of movable bed 31 in an extended position is illustrated in FIG. 10. In the embodiment illustrated in FIG. 10 movable bed 31 is extended outwardly on a plurality of rollers 52 from pick-up truck bed 22 and supported by pick-up truck tail gate 23, which is in an opened position.

Thus a pick-up truck bed attachment is disclosed which is highly versatile, inexpensive to manufacture and easy to use. Further, the disclosed pick-up truck bed attachment can carry large, heavy or cumbersome loads and is constructed to be extremely sturdy and stable. Also, the disclosed pick-up truck bed attachment provides increased storage capacity with ready access to all storage areas.

While I have shown and described specific embodiments of the present invention, further modifications and improvements will occur to those skilled in the art. I desire it to be understood, therefore, that this invention is not limited to the particular forms shown and I intend in the appended claims to cover all modifications that do not depart from the spirit and scope of this invention.

Having fully described the invention in such clear and concise terms as to enable those skilled in the art to understand and practice the same, the invention claimed is:

1. An attachment for a pick-up truck bed having an open topped rectangular box with upright sides, the attachment comprising:

a plurality of vertical supports having a lower end constructed to be attached to the pick-up truck bed;

a flat bed affixed to upper ends of the vertical supports;

racks pivotally attached adjacent edges of the flat bed for movement between a first upright position and a second lowered position by a plurality of pivots affixed to the flat bed; the racks having locking means that lock the racks to each other in the first upright position, each pivot being formed by a base member affixed to the flat bed, the base member extending vertically from the flat bed, the base member having a rod extending from the base member in opposite horizontal directions, the rod being positioned vertically on the base member above said flat bed to allow a tie down rope to be wound under the rod to hold a load down when the racks are not being used, and each rack having at least one plate with a hole therein affixed to a lower portion of the rack, the holes being aligned so that they mate with the rods and can be slid over the ends of the rods to easily put on and take off the racks to thereby allow the truck to haul using either the racks or a tie down rope, the plate having a thickness and the rod having a horizontal portion extending from the base member in the opposite horizontal directions a distance greater than the thickness of the plate.

2. An attachment as claimed in claim 1 wherein the vertical supports have a length sufficient to position the flat bed above the upright sides of the pick-up truck bed.

3. An attachment as claimed in claim 2 wherein the flat bed extends outwardly beyond the upright sides of the pick-up truck bed and the racks are positioned generally parallel with the upright sides of the pick-up truck bed and external thereto.

4. An attachment claimed in claim 1 having in addition horizontal tracks affixed adjacent lower ends of the vertical supports and a movable bed slidably engaged in the tracks.

5. An attachment as claimed in claim 1 wherein the racks include first and second side members and a rear member.

6. An attachment claimed in claim 5 wherein the first and second side members and the rear member include latches for securing the first and second side members and the rear member in an upright position.

7. An attachment as claimed in claim 5 including in addition a front rack attached adjacent a front edge of the flat bed.

8. An attachment as claimed in claim 1 wherein said pivot includes a base member having a hole extending therethrough with an elongated rod positioned in the hole and extending horizontally outwardly on opposite sides of the base member and means for affixing the elongated rod in the hole.

9. An attachment as claimed in claim 8 wherein the means for affixing the elongated rod in the hole includes a set screw.

10. An attachment as claimed in claim 8 wherein the racks include a plurality of plates, the plates being affixed to the racks so as to extend horizontally outwardly from the racks, each plate having a hole therein for pivotally engaging one of the elongated rods, the plates extending outwardly from the racks sufficiently to allow movement between a first upright position and a second lowered position.

11. An attachment as claimed in claim 1, further including means for affixing the elongated rod to the base member.

* * * * *